United States Patent
Qureshi (10) Patent No.: US 9,794,365 B2
(45) Date of Patent: Oct. 17, 2017

(54) RE-ESTABLISHING PUSH NOTIFICATION CHANNELS VIA USER IDENTIFIERS

(71) Applicant: Microsoft Technology Licensing, LLC, Redmond, WA (US)

(72) Inventor: Rashid Qureshi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 14/925,942

(22) Filed: Oct. 28, 2015

(65) Prior Publication Data

US 2016/0150046 A1    May 26, 2016

Related U.S. Application Data

(63) Continuation of application No. 14/257,540, filed on Apr. 21, 2014, now Pat. No. 9,185,179, which is a (Continued)

(51) Int. Cl.
*G06F 11/14* (2006.01)
*H04L 29/08* (2006.01)
(Continued)

(52) U.S. Cl.
CPC ...... *H04L 67/2833* (2013.01); *G06F 11/1443* (2013.01); *H04L 65/105* (2013.01); (Continued)

(58) Field of Classification Search
CPC .. G06F 11/1438; H04W 76/045; H04L 51/12; H04L 51/14; H04L 69/40
See application file for complete search history.

(56) References Cited

U.S. PATENT DOCUMENTS 6,760,861 B2    7/2004  Fukuhara et al.
7,191,233 B2 *  3/2007  Miller .................. H04L 29/06
                                               709/223
(Continued)

FOREIGN PATENT DOCUMENTS

CN    1939034 A    3/2007
CN    101009576 A  8/2007

OTHER PUBLICATIONS

"Push Notifications Overview for Windows", Retrieved at <<http://msdn.microsoft.com/en-us/library/ff402558(VS.92).aspx>>, Oct. 7, 2010, 1 page.
(Continued)

*Primary Examiner* — Joseph Schell (57) ABSTRACT

Embodiments enable recovery of push notification channels via session information associated with user identifiers. A proxy service creates session information describing push notification channels (e.g., subscriptions) for a user and associates the session information with a user identifier. The session information is stored in a cloud service or other storage area separate from the proxy service. After failure of a user computing device or the proxy service, the session information is obtained via the user identifiers and the push notification channels are re-created with the session information. In some embodiments, the proxy service enables delivery of the same notification to multiple computing devices associated with the user identifier.

20 Claims, 6 Drawing Sheets

Related U.S. Application Data continuation of application No. 13/015,602, filed on Jan. 28, 2011, now Pat. No. 8,713,365.

(51) Int. Cl.
*H04L 29/06* (2006.01)
*G06F 11/07* (2006.01)
*H04W 76/04* (2009.01)

(52) U.S. Cl.
CPC ...... *H04L 65/1063* (2013.01); *H04L 65/1069* (2013.01); *H04L 67/145* (2013.01); *H04L 67/26* (2013.01); *G06F 11/0709* (2013.01); *G06F 11/1438* (2013.01); *H04L 67/148* (2013.01); *H04W 76/045* (2013.01)

(56) References Cited

U.S. PATENT DOCUMENTS

| | | | |
|---|---|---|---|
| 7,197,049 B2 | 3/2007 | Engstrom et al. | |
| 7,441,011 B2 | 10/2008 | Lin et al. | |
| 7,487,248 B2* | 2/2009 | Moran | H04L 67/14 709/206 |
| 8,023,498 B2 | 9/2011 | Preston et al. | |
| 8,166,531 B2 | 4/2012 | Suzuki | |
| 8,214,471 B2* | 7/2012 | Doshi | H04L 67/34 709/220 |
| 8,219,621 B2* | 7/2012 | Laakkonen | H04L 51/14 709/204 |
| 8,589,496 B2* | 11/2013 | Boberg | H04L 67/14 709/203 |
| 8,688,826 B2* | 4/2014 | Black | G06F 1/3203 709/223 |
| 8,793,388 B2* | 7/2014 | Siegel | H04L 65/1016 370/328 |
| 2003/0054810 A1 | 3/2003 | Chen et al. | |
| 2003/0105813 A1 | 6/2003 | Mizutani | |
| 2004/0044721 A1 | 3/2004 | Song et al. | |
| 2004/0073512 A1 | 4/2004 | Maung | |
| 2005/0021514 A1 | 1/2005 | Barga et al. | |
| 2006/0291481 A1* | 12/2006 | Kumar | H04L 29/06027 370/400 |
| 2007/0162605 A1 | 7/2007 | Chalasani et al. | |
| 2008/0091489 A1 | 4/2008 | LaRock et al. | |
| 2008/0300049 A1* | 12/2008 | Anderson | G07F 17/32 463/25 |
| 2009/0063690 A1 | 3/2009 | Verthein et al. | |
| 2009/0125591 A1 | 5/2009 | Kirkpatrick | |
| 2009/0210536 A1 | 8/2009 | Allen et al. | |
| 2010/0049785 A1 | 2/2010 | Stoyanov et al. | |
| 2011/0041140 A1 | 2/2011 | Harm et al. | |
| 2011/0238734 A1 | 9/2011 | Curry et al. | |
| 2011/0258332 A1 | 10/2011 | Fan et al. | |
| 2012/0046110 A1 | 2/2012 | Amaitis et al. | |
| 2012/0198268 A1 | 8/2012 | Qureshi | |

OTHER PUBLICATIONS

Yochay, "Understanding How Microsoft Push Notification Works", Retrieved at <<http://windowsteamblog.com/windows_phone/b/wpdev/archive/2010/05/04/understanding-how-microsoft-push-notification-works-part-2.aspx>>, May 4, 2010, 6 pages.

"Using the Azure asp.net Providers", Retrieved at <<http://msdn.microsoft.com/en-us/wazplatformtrainingcourse_buildingasp.netwebformapplicationswithwindowsazurevs2010_topic2.aspx>>, Retrieved Date: Nov. 15, 2010, 11 pages.

Bright, Peter, "New Microsoft betas push "private cloud" strategy", Retrieved at <<http://arstechnica.com/microsoft/news/2010/05/redmond-releases-appfabric-biztalk-betas-for-on-premises-clouds.ars>>, Retrieved Date: Nov. 15, 2010, 1 page.

Wikipedia's Cloud Storage version from Jan. 25, 2011 http://en.wikipedia.org/w/index.php?title=Cloud_storage&oldid=409933192, 1 page.

Wikipedia's Push Technology version from Dec. 31, 2010 http://en.wikipedia.org/w/index.php?title=Push_technology@oldid=405148137, 1 page.

Wikipedia's XMPP version from Jan. 27, 2011 http://en.wikipedia.org/w/index.php?title=XMPP&oldid=410293499, 7 pages.

"Non-Final Office Action for U.S. Appl. No. 13/015,602", Mailed Date: Apr. 1, 2013, filed Jan. 28, 2011, 17 pages.

"Final Office Action for U.S. Appl. No. 13/015,602", Mailed Date: Jul. 5, 2013, filed Jan. 28, 2011, 20 pages.

"Notice of Allowance for U.S. Appl. No. 13/015,602", Mailed Date: Dec. 11, 2013, filed Jan. 28, 2011, 9 pages.

"First Office Action for Chinese Patent Application No. 201210020280.3", Mailed Date: Mar. 5, 2014, Filed Date: Jan. 29, 2012, 13 pages.

Niall, "Using Windows Azure tables to persist session data", Retrieved at <<http://niallbest.com/using-windows-azure-tables-to-persist-session-data/>>, Aug. 2, 2010, 4 pages.

"Non-final Office Action Issued in U.S. Appl. No. 14/257,540", Mailed Date: Feb. 27, 2015, 7 pages.

"Notice of Allowance Issued in U.S. Appl. No. 14/257,540", Mailed Date: Jul. 8, 2015, 5 Pages.

"Notice of Allowance Issued in Chinese Patent Application No. 201210020280.3", Mailed date: Jul. 9, 2014, 4 Pages.

* cited by examiner

RE-ESTABLISHING PUSH NOTIFICATION CHANNELS VIA USER IDENTIFIERS

CROSS-REFERENCE TO RELATED APPLICATIONS

This application is a continuation of U.S. application Ser. No. 14/257,540, filed Apr. 21, 2014, which is a continuation of U.S. application Ser. No. 13/015,602, filed Jan. 28, 2011, the entireties of which are hereby incorporated by reference herein.

BACKGROUND

Existing push notification frameworks deliver notifications from application services to client devices via a proxy service. The proxy service maintains notification channels for delivering the notifications to applications executing on the client devices, and stores session information describing the channels. If the client devices or proxy service reboots or fails, the applications restart and attempt to re-establish connections to the proxy service and to the application services.

While some existing systems allow applications to create notification channels without user intervention, the session information is tied to the proxy service and/or the client devices. After a reboot or failure, the client devices still have to re-establish the connections to the proxy service and to the application services.

SUMMARY

Embodiments of the disclosure associate session information with a user. A proxy service receives, from a user computing device in a push environment, a request to establish at least one push notification channel to receive notifications from an application service. The request includes a user identifier. The proxy service obtains session information based on the user identifier and establishes the push notification channel based on the obtained session information. The proxy service delivers notifications from the application service to the user computing device via the established push notification channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable push notification channels 108 to be re-created based on user identifiers 118 in the event of a failure. In some embodiments, session information 202 describing the push notification channels 108 is associated with the user identifiers 118 and stored in a memory area separate from a proxy service 102 or other gateway. The proxy service 102 receives notifications from application services 104 for delivery to user computing devices 106.

Aspects of the disclosure further enable the user computing device 106, after experiencing a failure of the notification session, to reconnect to any server associated with a proxy service 102 and present the user identifier 118 to enable that server to re-establish the notification session using information stored in a cloud service 312.

Figure 1:
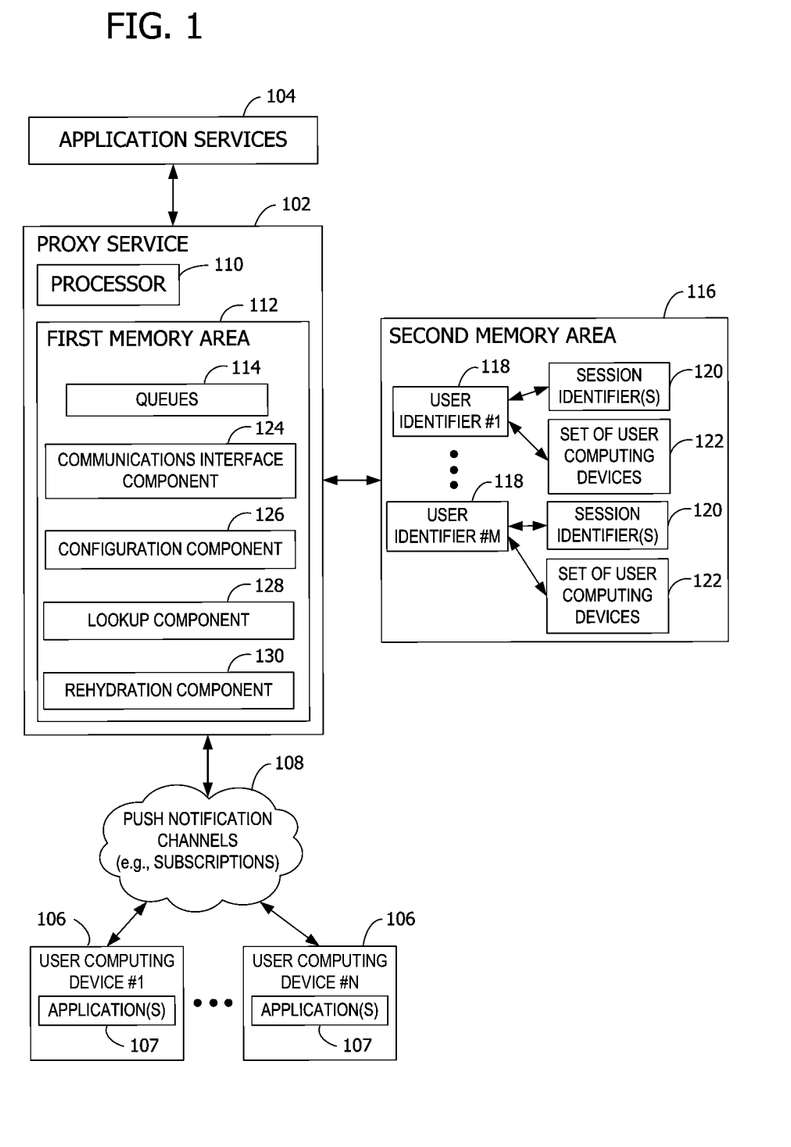
FIG. 1 is an exemplary block diagram illustrating a proxy service delivering notifications from application services to user computing devices.

Referring next to FIG. 1, an exemplary block diagram illustrates a proxy service 102 delivering notifications from application services 104 to user computing devices 106 in a push environment. In the exemplary push environment illustrated in FIG. 1, one or more of the application services 104 generate notifications to be pushed to applications 107 executing on the user computing devices 106. The notifications are pushed asynchronously, and the notification flow is unidirectional in that the notifications are sent by the application services 104 to the applications 107 for consumption. Exemplary application services 104 include web sites such as social networking web sites, news web sites, and financial web sites. Other application services 104 are contemplated, and include electronic mail and other messaging services. Exemplary notifications include updates to online social profiles, weather and traffic conditions, package delivery notifications, text messages, electronic mail messages, voice messages, images, and video.

The proxy service 102 represents any computing device or devices executing instructions (e.g., as application programs, operating system functionality, or both) to implement the operations and functionality associated with the proxy service 102. The proxy service 102 may include any computing device such as a server, cloud computing arrangement, personal computer, or the like. Additionally, the proxy service 102 may represent a group of processing units or other computing devices.

The proxy service 102 has at least one processor 110 and a first memory area 112. The processor 110 includes any quantity of processing units, and is programmed to execute computer-executable instructions for implementing aspects of the disclosure. The instructions may be performed by the processor 110 or by multiple processors executing within the proxy service 102, or performed by a processor external to the proxy service 102. In some embodiments, the processor 110 is programmed to execute instructions such as those illustrated in the figures (e.g., FIG. 3 and FIG. 4).

The proxy service 102 further has one or more computer-readable media such as the first memory area 112. The first memory area 112 includes any quantity of media associated with or accessible by the proxy service 102. The first memory area 112 may be internal to the proxy service 102 (as shown in FIG. 1), external to the proxy service 102 (not shown), or both (not shown).

The first memory area 112 stores, among other data, one or more queues 114 or other message buffers. In some embodiments, each of the queues 114 is associated with one of the applications 107 executing on the user computing devices 106.

The memory area further stores one or more computer-executable components. Exemplary components include a communications interface component 124, a configuration component 126, a lookup component 128, and a rehydration component 130. Operation of the components is described below with reference to FIG. 3 and FIG. 4.

The push environment further includes a second memory area 116. The second memory area 116 represents, for example, the cloud service 312 or other service providing storage functionality separate or remote from the proxy service 102. The second memory area 116 may be accessible to the proxy service 102 via a network. In the example of FIG. 1, the second memory area 116 includes a plurality of user identifiers 118, such as user identifier #1 through user identifier #M. Each of the user identifiers 118 corresponds or maps to at least one session identifier 120 and a set 122 of user computing devices of a user associated with the user identifier 118. The session identifiers 120 correspond or link to session information 202 (e.g., as in FIG. 2). The set 122 of user computing devices represents the user computing devices 106 that execute applications 107 subscribed to receive notifications from the application services 104. In some embodiments, the set 122 of user computing devices is considered a part of the session information 202 maintained in the second memory area 116. For example, each device in the set 122 of user computing devices is identified by a device identifier 206.

Exemplary session information 202 stored in the second memory area 116 includes subscription information, user computing device information (e.g., the device identifier 206), state, Internet Protocol (IP) address of the user computing device 106, and information about the application 107 such as an application identifier (ID). In some embodiments, a particular application 107 has the same application identifier on multiple platforms (e.g., mobile device, laptop, gaming console, etc.).

The user computing devices 106 include, for example, user computing device #1 through user computing device #N. Each user computing device 106 includes any computing device such as a mobile computing device or any other portable device. In some embodiments, the user computing device 106 includes a mobile telephone, tablet, laptop, netbook, gaming console, and/or portable media player. The user computing device 106 may also include less portable devices such as desktop personal computers, kiosks, and tabletop devices. The user computing devices 106 execute one or more of the applications 107. The applications 107, when executed by the user computing devices 106, operate to perform functionality on the user computing devices 106. Exemplary applications 107 include mail application programs, web browsers, calendar application programs, address book application programs, messaging programs, media applications, location-based services, search programs, and the like. The applications 107 may communicate with counterpart applications or services such as web services accessible via a network. For example, the applications 107 may represent downloaded client-side applications that correspond to server-side services executing in a cloud.

In operation, the proxy service 102 receives the notifications from the application services 104 and stores the received notifications in the queues 114. The notifications are stored in the queues 114 based on the session information 202 (e.g., obtained from the second memory area 116, or cached in the first memory area 112). Based on the session information 202, the notifications are sent by the proxy service 102 from the queues 114 to the corresponding applications 107 via the push notification channels 108. The push notification channels 108 are communication channels established between the proxy service 102 and the applications 107.

Figure 2:
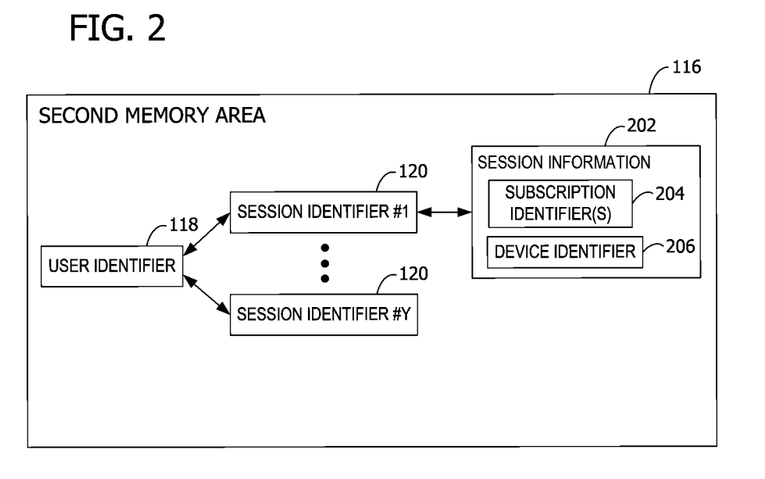
FIG. 2 is an exemplary block diagram illustrating a memory area storing session information relating to a push environment and corresponding to a user identifier.

Referring next to FIG. 2, an exemplary block diagram illustrates the second memory area 116 storing session information 202 relating to a push environment and corresponding to one of the user identifiers 118. The data stored in the second memory area 116 may be organized and/or stored in any form or format, such as a relational database, text files, and hypertext links. Each user identifier 118 corresponds to one or more of the session identifiers 120, such as session identifier #1 through session identifier #Y. Each session identifier 120 has corresponding session information 202. The session information 202 includes a description of one or more subscriptions. The subscriptions, represented by subscription identifiers 204, identify the applications 107 (e.g., via application identifiers) that are subscribed to receive notification from particular application services 104. The session information also includes the device identifier 206 corresponding to the particular user computing device 106 associated with the session.

Figure 3:
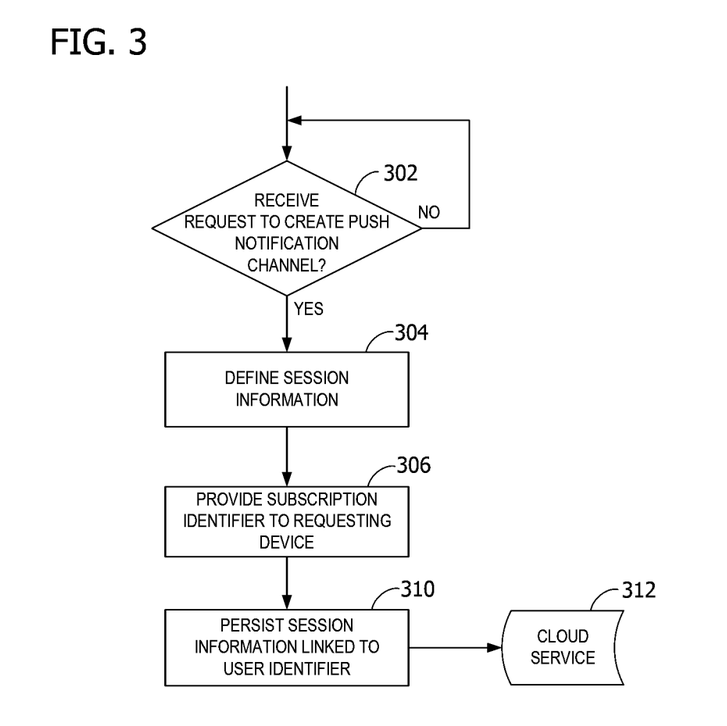
FIG. 3 is an exemplary flow chart illustrating operation of the proxy service to create and persist session information corresponding to a user identifier.

Referring next to FIG. 3, an exemplary flow chart illustrates operation of the proxy service 102 to create and persist session information 202 corresponding to a user identifier 118. Each session corresponds to one of the user computing devices 106 and the connection between the user computing device 106 and the proxy service 102. Applications 107 executing on the user computing devices 106 desire to receive notifications from the application services 104. In response, the user computing device 106 (e.g., a client stack executing thereon) establishes or defines a session to be associated with the device identifier 206 and the user identifier 118. The user computing device 106 provides the device identifier 206 and the user identifier 118 to the proxy service 102. In some embodiments, the application identifier of the requesting application is also sent to the proxy service 102.

If the proxy service 102 receives the request to create one of the push notification channels 108 at 302 (e.g., create the subscription), the proxy service 102 creates a session identifier 120 for association with the device identifier 206 and the user identifier 118 provided by the user computing device 106. The proxy service 102 then defines session information 202 at 304 associated with the session identifier 120 to include, for example, a subscription identifier 204 and the device identifier 206. The subscription identifier 204 represents the requested subscription.

If a session identifier 120 corresponding to the device identifier 206 and the user identifier 118 already exists, the proxy service 102 updates the session information 202 associated with the session identifier 120 to include the subscription identifier 204. In addition, the proxy service 102 adds the same subscription identifier 204 to any other session identifiers 120 associated with the user identifier 118. For example, the user identifier 118 may have three session identifiers 120 associated therewith: one for a mobile device, one for a laptop, and one for a gaming console.

The proxy service 102 provides the subscription identifier 204 to the requesting user computing device 106 at 306. The proxy service 102 persists the session information 202 at 310 by storing the session information 202 linked to the user identifier 118 in, for example, a cloud service 312.

In some embodiments, the provided subscription identifier 204 takes the form of a uniform resource location (URL) containing the domain name service of the proxy service 102, the user identifier 118, and the application identifier. The format of the URL may include, for example, http://<proxyservice>/<useridentifier><applicationidentifier>.

The requesting application 107 subsequently provides the URL to the corresponding application service 104. The corresponding application service 104 uses the URL to push notifications to the proxy service 102 for delivery to the intended user computing devices 106. For example, as described below, the proxy service 102 extracts the user identifier 118 from the URL, finds the sessions associated with the extracted user identifier 118, and for each active session queues the notification for delivery.

In some embodiments, the operations illustrated in FIG. 3 may be implemented by one or more of the computer-executable components illustrated in FIG. 1. For example, the communications interface component 124, when executed by the processor 110, causes the processor 110 to receive, from the user computing device 106, a request to create a session including a push notification channel 108 (e.g., a subscription). The request includes, for example, the user identifier 118 and the application identifier. In some embodiments, the communications interface component 124 includes a network interface card and/or computer-executable instructions (e.g., a driver) for operating the network interface card.

The configuration component 126, when executed by the processor 110, causes the processor 110 to define the session information 202, to establish the push notification channel 108 from the proxy service 102 to the user computing device 106, and to store the session information 202 in the cloud service 312. The session information 202 includes a subscription identifier and a session identifier corresponding to the user identifier and to the application identifier. The communications interface component 124 sends the subscription identifier 204 to the user computing device 106.

After receiving the subscription identifier 204 from the proxy service 102, the user computing device 106 (e.g., an application 107 executing on the user computing device 106) registers the subscription identifier 204 with the application service 104 to which the application 107 desires to subscribe to notifications. In such an example, the application service 104 is configured to push notifications to the application 107 via the subscription identifier 204.

Figure 4:
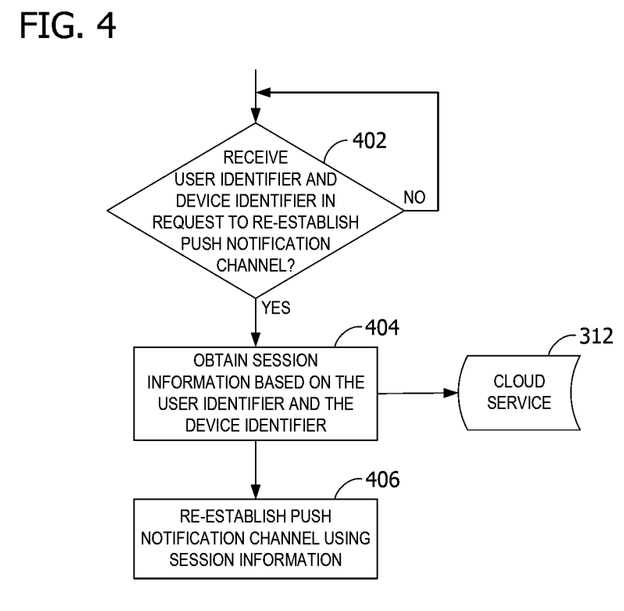
FIG. 4 is an exemplary flow chart illustrating operation of the proxy service to re-establish a push notification channel using session information corresponding to a user identifier.

Referring next to FIG. 4, an exemplary flow chart illustrates operation of the proxy service 102 to re-establish a push notification channel 108 using session information 202 corresponding to a user identifier 118. For example, the proxy service 102 and/or user computing device 106 may have experienced a reboot, crash, or other failure. Alternatively or in addition, the session carrying the push notification channel 108 (e.g., subscriptions) may have failed. If the server associated with the proxy service 102 to which the user computing device 106 is connected fails, the user computing device 106 may seek out another server associated with the proxy service 102 to which to connect per the operations illustrated in FIG. 4. If the user computing device 106 rebooted, the user computing device 106 (after rebooting) attempts to reconnect to the proxy service 102 via the operations illustrated in FIG. 4.

The proxy service 102 may receive a request from the user computing device 106 to establish at least one push notification channel 108 to receive notifications from the application service 104 at 402. The request includes a user identifier 118 associated with a user of the user computing device 106 and the device identifier 206 of the user computing device 106. If the proxy service 102 receives the request at 402, the proxy service 102 obtains session information 202 associated with the user identifier 118 and the device identifier 206 at 404. For example, the proxy service 102 provides the cloud service 312 with the user identifier 118 and the device identifier 206 from the received request, and receives the associated session information 202 from the cloud service 312 in response thereto. The session information 202 includes the subscription identifier(s) for the applications 107 associated with the user computing device 106 identified by the user identifier 118.

In some embodiments, the proxy service 102 obtains a session identifier 120 based on the user identifier 118 and the device identifier 206 obtains the session information 202 from the cloud service 312. In such embodiments, the proxy service 102 may first communicate with the cloud service 312 to obtain the session identifier 120 (e.g., if the cloud service 312 stores a mapping between user identifiers 118, device identifiers 206, and session identifiers 120), and then communicate with the cloud service 312 (or another cloud service) to obtain the session information 202 based on the session identifier 120. In embodiments in which the proxy service 102 caches a mapping between the user identifiers 118, device identifiers 206, and the session identifiers 120, the proxy service 102 obtains the session identifier 120 by accessing the cache, then communicates with the cloud service 312 to obtain the session information 202 based on the session identifier 120.

The proxy service 102 proceeds to re-establish the session containing the push notification channel(s) 108 at 406 using the session information 202 obtained from the cloud service 312. After re-establishing the push notification channel 108, the proxy service 102 is able to deliver notifications received from the application service 104 to the user computing device 106 via the established push notification channel 108. Each of the notifications includes, for example, a globally unique identifier (GUID) that identifies the application 107 to which the notification should be delivered. In some embodiments, the GUID includes the user identifier 118.

In an example in which the user has two devices and one of them reboots, the rebooted device sends a reconnect request to the proxy service 102 including the device identifier 206 of the rebooted device and the user identifier 118 of the user. If the reconnect request is handled by a server associated with the proxy service 102 that has cached session information 202 about the user, the server obtains the subscription identifiers 204 for the relevant session (e.g., using the device identifier 206) and re-establishes the subscriptions associated with the rebooted device. If the reconnect request is handled by a server associated with the proxy service 102 that does not have cached session information 202 about the user, the server obtains the relevant session information 202 from the cloud service 312 using the user identifier 118 and the device identifier 206. The server proceeds to re-establishes the subscriptions associated with the rebooted device. In this manner, only the subscriptions associated with the rebooted device are rehydrated, while the sessions associated with other user computing devices 106 of the user remain unaffected.

In some embodiments, the user computing device 106 establishes a plurality of push notification channels 108

(e.g., a plurality of applications 107 executing on the user computing device 106 subscribe to receive notifications). If an application 107 on a particular user computing device 106 was active (e.g., executing) before a failure of the user computing device 106 and becomes non-active (e.g., not executing, or no longer installed) after the user computing device 106 recovers from the failure, the user computing device 106 may provide the proxy service 102 with this information. For example, a client stack on the user computing device 106 identifies a first set of the applications 107 to the proxy service 102 after recovering from the failure. The first set of the applications 107 represents the applications 107 that are currently active on the user computing device 106. The proxy service 102 compares the first set of the applications 107 to a second set of the applications 107 associated with the session information 202 to identify one or more non-active applications. The second set of the applications 107 represents the applications 107 previously executing on the user computing device 106. The proxy service 102 suppresses delivery of notifications to the identified non-active applications.

In another embodiment, the proxy service 102 receives an error response from the user computing device 106 if the intended recipient application 107 of a notification is non-active. The proxy service 102 suppresses delivery of future notifications to the non-active application 107. For example, the session information 202 associated with the user computing device 106 is updated to reflect that the subscription associated with the non-active application 107 is suppressed. If the user subsequently installs or re-activates the application 107, the application 107 send a subscription request including the application identifier of the application 107 to the proxy service 102. In response, the proxy service updates the session information 202 to unsuppress the previously-suppressed subscription (e.g., via the application identifier) associated with the user computing device 106. In some embodiments, the proxy service 102 returns a message to the user computing device 106 that the existing subscription was unsuppressed.

In some embodiments, the operations illustrated in FIG. 3 may be implemented by one or more of the computer-executable components illustrated in FIG. 1. For example, the communications interface component 124 receives the request from the user computing device 106 to re-establish the failed push notification channel 108. The lookup component 128, when executed by the processor 110, causes the processor 110 to obtain, from the cloud service 312, the session information 202 based on the user identifier 118. The rehydration component 130, when executed by the processor 110, causes the processor 110 to re-establish the session containing the push notification channel 108 based on the session information 202 obtained by the lookup service component using the user identifier 118.

Further, the request received by the communications interface component 124 may identify the set of active applications associated with the user computing device 106. The rehydration component 130, when executed by the processor 110, re-establishes push notification channels 108 for only the active applications identified in the set of active applications.

Figure 5:
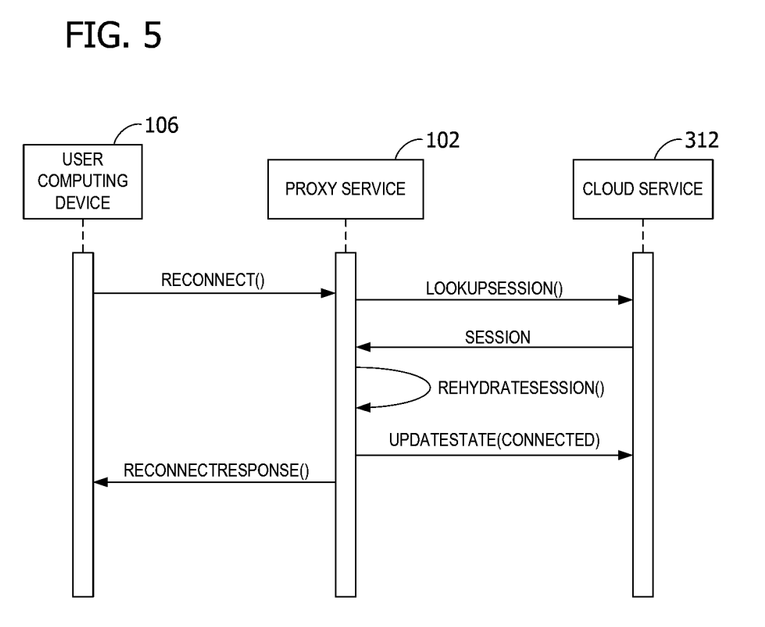
FIG. 5 is an exemplary sequence diagram illustrating communication among the user computing device, the proxy service, and the cloud service to rehydrate a session in a push environment.

Referring next to FIG. 5, an exemplary sequence diagram illustrates communication among the user computing device 106, the proxy service 102, and the cloud service 312 to rehydrate a session in a push environment. In the example of FIG. 5, the user computing device 106 attempts to re-establish push notification channels 108 by sending a request to the proxy service 102 via a function call Reconnect( ). This function call may be part of an application programming interface (API) provided by the proxy service 102. An argument for the Reconnect( ) function call includes the user identifier 118, in some embodiments. The proxy service 102 obtains session information 202 associated with the request by sending the user identifier 118 to the cloud service 312 as an argument in a function call LookupSession( ). Responsive to the LookupSession( ) function call, the cloud service 312 determines and provides the session information 202 to the proxy service 102. The proxy service 102 rehydrates the sessions via RehydrateSession( ) or another function call. Rehydrating the session results in session state being copied to the proxy service 102 and/or repopulated into memory associated with a session manager associated with the proxy service 102 to re-establish the push notification channels 108.

After rehydrating the session, the proxy service 102 informs the cloud service 312 of session state via a function call UpdateState(Connected), for example. Other exemplary session states include disconnected and inactive. The proxy service 102 also informs the user computing device 106 of the rehydrating via a function call ReconnectResponse( ).

In some embodiments, the proxy service 102 represented in FIG. 5 includes a session manager and a lookup service. In such embodiments, the session manager executes the configuration component 126 and the rehydration component 130 from FIG. 1, while the lookup service executes the lookup component 128.

Figure 6:
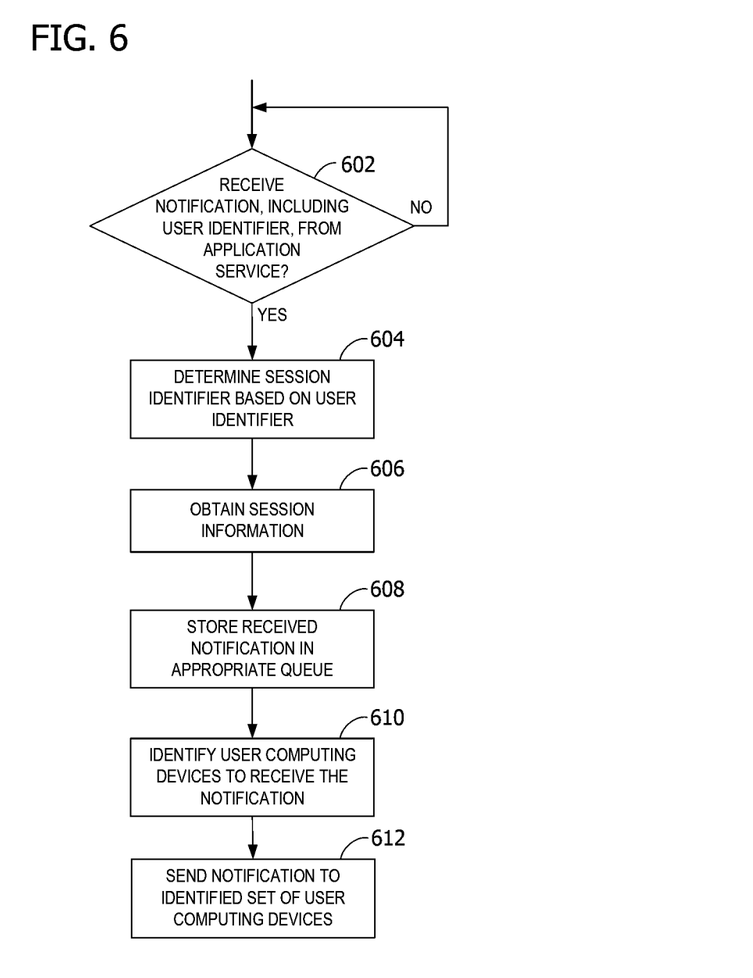
FIG. 6 is an exemplary flow chart illustrating operation of the proxy service to deliver notifications to user computing devices based on a user identifier determined from a session identifier.

Referring next to FIG. 6, an exemplary flow chart illustrates operation of the proxy service 102 to deliver notifications to user computing devices 106 based on a user identifier 118 determined from a session identifier 120. In the example of FIG. 6, the push notification channels 108 are established. If the proxy service 102 receives a notification from one of the application services 104 at 602 for delivery to at least one of the user computing devices 106, the proxy service 102 determines a session identifier 120 associated with the notification at 604. In some embodiments, the received notification includes a user identifier 118 (e.g., part of the GUID, or elsewhere in a header of the notification). The proxy service 102 determines the session identifier 120 based on the user identifier 118. For example, the proxy service 102 may communicate with the cloud service 312 or the second memory area 116 to obtain the session identifier 120.

Using the session identifier 120, the proxy service 102 obtains the session information 202 associated with the notification at 606. For example, the proxy service 102 may communicate with the cloud service 312 or the second memory area 116 to obtain the session information 202. Using the session identifier 120 and/or other session information 202, the proxy service 102 stores the notification in the appropriate queue 114 at 608 for eventual delivery to the destined user computing devices 106.

The proxy service 102 uses the obtained session information 202 to determine how to deliver the received notification. Further, at 610, the proxy service 102 identifies the user computing devices 106 to receive the notification. For example, the proxy service 102 may communicate with the cloud service 312 or the second memory area 116 to determine a set 122 of user computing devices associated with the user identifier 118 (or the session identifier 120).

The proxy service 102 delivers the notification from the queue 114 to the identified set 122 of user computing devices at 612 via the push notification channels 108 as described by the session information 202.

Additional Examples

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 3 and FIG. 4 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media. Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for associating session information 202 in the push environment with a user, and exemplary means for the proxy service 102 to re-establish the push notification channels 108 using session information 202 corresponding to the user identifier 118, said session information 202 stored separately from the proxy service 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
a memory area accessible by a proxy service, said memory area storing a first mapping between a session identifier and a user identifier, and a second mapping between the user identifier and a set of user computing devices, the second mapping including a first link between the user identifier and a first user computing device of the set of user computing devices, wherein said proxy service communicates with the set of user computing devices via push notification channels; and
a processor programmed to:
receive, by the proxy service from a second user computing device of the set of user computing devices, a first request to identify the first user computing device as non-active;
in response to the received first request, disable the first link between the user identifier and the first user computing device such that communication between the first user computing device and the proxy service is suppressed;
receive, by the proxy service from the second user computing device, a second request to identify the first user computing device as active; and
in response to the received second request, enable the first link between the user identifier and the first user computing device such that the communication between the first user computing device and the proxy service is unsuppressed.

2. The system of claim 1, wherein the proxy service sends a message to the first user computing device, the message indicating that the previously-disabled first link is enabled.

3. The system of claim 1, wherein the second request includes a globally unique identifier (GUID), the GUID including at least the user identifier.

4. A method of re-establishing a failed push notification channel, the method comprising:
identifying a first user computing device as non-active, a first mapping coupling one or more session identifiers to a user identifier, a second mapping coupling the user identifier to a set of user computing devices including the first user computing device, the second mapping including a first link between the user identifier and the first user computing device;
in response to the identifying the first user computing device as being non-active, disabling the first link between the user identifier and the first user computing device such that communication between the first user computing device and a proxy service is suppressed, the proxy service configured to communicate with the set of user computing devices via push notification channels;
receiving, by the proxy service, a request from a second user computing device of the set of user computing devices to identify the first user computing device as active; and
in response to the received request, enabling the first link between the user identifier and the first user computing device such that the communication between the first user computing device and the proxy service is unsuppressed.

5. The method of claim 4, wherein receiving the request from the second user computing device to identify the first user computing device as active comprises receiving the user identifier and a device identifier of the second user computing device, the second user computing device being a rebooted computing device.

6. The method of claim 4, wherein receiving the request from the second user computing device to identify the first user computing device as active comprises determining a request handler for the request.

7. The method of claim 4, wherein receiving the request from the second user computing device to identify the first user computing device as active comprises obtaining, from a server associated with the proxy service, at least one session identifier of the one or more session identifiers by using a device identifier.

8. The method of claim 4, wherein receiving the request from the second user computing device to identify the first user computing device as active comprises obtaining, from a cloud service, at least one session identifier of the one or more session identifiers by using the user identifier and a device identifier.

9. The method of claim 4, wherein receiving the request from the second user computing device to identify the first user computing device as active comprises unsuppressing one or more previously-suppressed subscriptions based on one or more application identifiers.

10. The method of claim 4, wherein receiving the request from the second user computing device to identify the first user computing device as active comprises receiving the user identifier and an application identifier.

11. The method of claim 4, wherein enabling the first link between the user identifier and the first user computing device comprises sending, by the proxy service, a message to the first user computing device, the message indicating that the previously-non-active first user computing device is identified as active.

12. The method of claim 4, further comprising:
identifying, by the proxy service, a first set of applications executing on the second user computing device, the first set of the applications representing applications that are currently active on the second user computing device;
comparing the first set of applications to a second set of applications to identify one or more non-active applications, the second set of the applications representing applications previously executing on the second user computing device; and
suppressing, by the proxy service, delivery of notifications intended for the one or more non-active applications.

13. The method of claim 4, further comprising obtaining session information based on at least one session identifier of the one or more session identifiers.

14. The method of claim 13, further comprising re-establishing, by the proxy service, the failed push notification channel using the session information corresponding to the user identifier, the session information being stored separately from the proxy service.

15. The method of claim 4, further comprising obtaining, by the proxy service, the one or more session identifiers from the cloud service, wherein the cloud service stores a mapping between the user identifier, the device identifier, and session information.

16. The method of claim 4, further comprising updating, by the proxy service, session information in response to subsequent re-activation of one or more non-active applications of the second user computing device.

17. The method of claim 4, further comprising receiving, by the proxy service from the second user computing device, an error response indicating that an intended recipient application for receiving a future notification is non-active.

18. The method of claim 4, further comprising receiving, by the proxy service from the second user computing device, information associated with one or more applications that were active before rebooting the second user computing device and became non-active after rebooting the second user computing device.

19. One or more computer readable storage devices having computer-executable components, said computer-executable components being associated with a proxy service in a push environment, the proxy service configured to communicate with a set of user computing devices including a first user computing device and a second user computing device, said computer-executable components comprising:
a communications interface component that upon execution by at least one processor causes the at least one processor to receive, by the proxy service from the second user computing device, a request to identify the first user computing device as active, wherein communication between the first user computing device and the proxy service is suppressed, and the request includes a user identifier of a user and a device identifier of the first user computing device;
a lookup component that upon execution by at least one processor causes the at least one processor to obtain, from a cloud service, session information based on the user identifier and the device identifier included in the request received by the communications interface component; and a rehydration component that upon execution by at least one processor causes the at least one processor to unsuppress the communication between the first user computing device and the proxy service based on the session information obtained by the lookup service component.

20. The one or more computer readable storage devices of claim 19, said computer-executable components further comprising a session manager that upon execution by the at least one processor causes the at least one processor to execute a configuration component and the rehydration component, the configuration component defining the session information for re-establishing a push notification channel from the proxy service to the rebooted second user computing device.

* * * * *